Jan. 5, 1960 KOJI GOTOH 2,920,211
SYSTEM FOR GENERATING ELECTRIC POWER WITHOUT INTERRUPTION
Filed July 14, 1955 2 Sheets-Sheet 1

INVENTOR
KOJI GOTOH
BY
ATTORNEYS

INVENTOR
KOJI GOTOH

United States Patent Office 2,920,211
Patented Jan. 5, 1960

2,920,211

SYSTEM FOR GENERATING ELECTRIC POWER WITHOUT INTERRUPTION

Koji Gotoh, Tokyo-to, Japan, assignor to Kokusai Denki Kabushiki-Kaisha, Tokyo-to, Japan Application July 14, 1955, Serial No. 522,129

Claims priority, application Japan March 30, 1955

6 Claims. (Cl. 290—30)

This invention relates to a system and an installation for continuously generating electric power without interruption by employing an electric motor-generator unit.

A system for generating electric power, in which storage batteries which have been charged are equipped always for feeding an electric power upon occurrence of an emergency such as failure or substantial drop of the input voltage of the motor, has been well-known. Although said system is very stable and reliable, installation thereof costs a lot of money and also requires a considerable space. Furthermore, its supervision is very troublesome.

For avoiding the said disadvantages, it has been adopted to drive the generator by an additionally equipped engine upon failure or substantial drop of the input voltage of the motor. According to such system, however, several decaseconds are necessary for starting the engine, so that electric power supply will be interrupted until the completion of the said starting. For compensating the said disadvantage, particularly in the case of employing the motor-generator unit as the power source of an electric communication system in which a momentary power failure is not permitted, it has been adopted to attach a very large flywheel to the rotary shaft of the generator so as to drive the generator by the accumulated energy of the said flywheel upon failure or substantial drop of the input voltage of the motor to prevent interruption of power supply until completion of the engine starting. However, there is nothing new in such system than that it employs an engine instead of storage batteries.

An important object of the present invention is to provide a novel system capable of continuously generating electric power with very simple and economical installation in a stable and reliable operation.

The said object and other objects of this invention have been accomplished by the system comprising a gas turbine whose shaft is driven by the rotary shaft of the electric motor-generator unit, the said turbine being supplied with a medium for operating said turbine upon failure or substantial drop of the input voltage of the motor to insure an uninterrupted driving of the said motor-generator unit.

The novel features which I believe to be characteristic of my invention are set forth with particularity in the appended claims. My invention, however, both as to its manner of arrangement and method of operation together with further objects and advantages thereof, may best be understood by reference to the following description, taken in connection with the accompanying drawings wherein the same members are designated by the same reference characters and in which:

Figure 1:
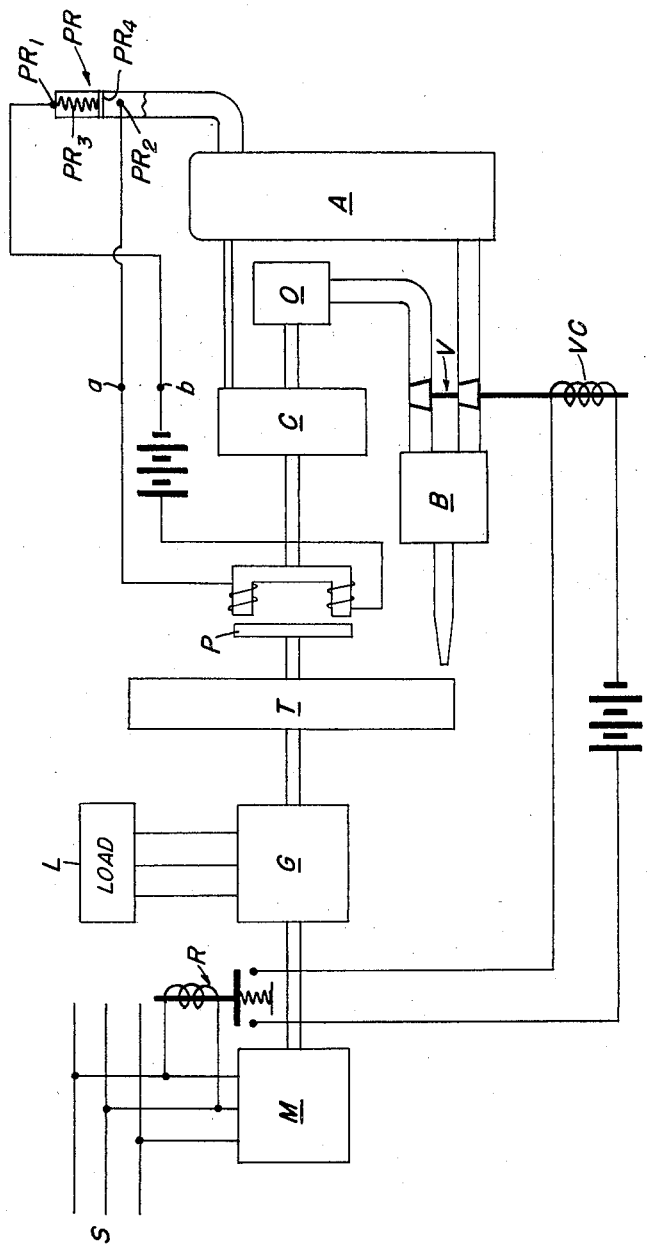
Figure 1 is a schematic diagram showing one embodiment of the invention.

Referring to Figure 1 of the drawing, the installation for generating electric power is mainly composed of an electric motor M which is always fed with an electric power from power lines S, an electric generator G driven by the said motor and feeding the load L with an electric power, a gas turbine T driven always by the rotary shaft of the said generator, an air compressor C, an oil pump O, a clutch P inserted between the shaft of the said gas turbine and the shaft of the said compressor, an air tank A which is supplied with compressed air from the said compressor C, and an oil burner B which is supplied with fuel from the said oil pump O and with compressed air from the said air tank A, the said compressor and pump having a common shaft which is driven by the rotary shaft of the motor-generator unit through the said clutch P when it is operated.

According to this invention, a voltage relay R is inserted at the input side of the motor M, said relay acting upon failure or substantial drop of the input voltage of the motor M, and in the pipes communicating the burner B with the oil pump O and air tank A are equipped valve V. The said valve and relay R are so related that the former is closed by operation of the latter, such response being made by providing an electromagnetic coil VC which is excited when the relay R is operated so as to pull the valve V at its closed position.

Furthermore, the clutch P is a magnetic clutch having a magnetic coil which can be excited by a pressure relay PR upon drop of the pressure in the air tank A under a predetermined level, such pressure relay being provided on the air tank A and being composed of two normally open stationary contacts $PR_1$ and $PR_2$ arranged in an enclosed tube communicating with the interior of the tank A, and a slider $PR_4$ supported by a spring $PR_3$ connected to contact $PR_1$ so that said slider $PR_4$ may be urged into contact with contact $PR_2$ by the force of the spring when the pressure in the tank A drops under a predetermined value. Accordingly, there is a time lag between operation of the clutch P and the valve V.

Figure 2:
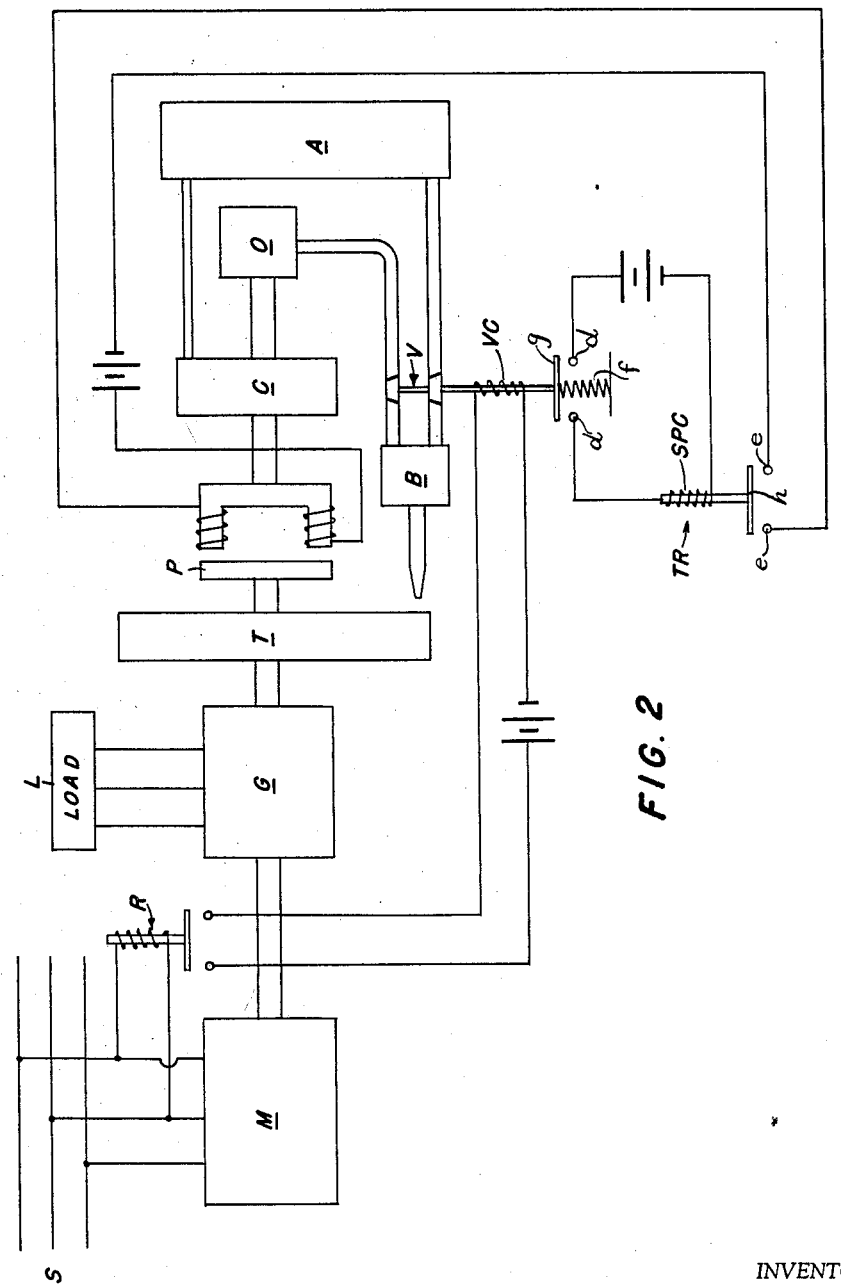
Figure 2 is a schematic diagram showing another embodiment of the invention.

Said time lag may be obtained as shown in Figure 2, by connecting the exciting circuit of the clutch P with its electric source through armature $h$ of a time relay TR which is so coupled with the valve V that the exciting circuit of the relay can be excited when the valve is opened, said relay being composed of stationary contacts $e$, a movable contact $h$ and an exciting coil SPC which pulls the contact with a time delay when it is excited so as to short circuit contacts $e$, and which is connected to an electric source through contacts $d$ which are short circuited by armature $g$ when it is pulled against a spring $f$ by excitation of the coil VC for opening the valve V.

Operation of the above-mentioned installation is as follows:

When the input voltage of the motor M drops under a specified level, the valve V is opened by the operation of the relay R, so that the gas turbine T is supplied with the compressed air stored in the tank A through the gas burner B and is driven as an air turbine. In this case, the oil pump O and air compressor are not operated, because the clutch P is not operated, so that oil is not supplied to the burner B.

After a time lag, the clutch operates by a pressure relay PR equipped at the air tank (Fig. 1) or by a time relay TR (Fig. 2) related to the opening of the valve V, so that the oil pump O and the air compressor C are driven by the shaft of the motor-generator unit through the clutch P, whereby a mixture of fuel and compressed air is fed to the turbine T through the burner B.

Accordingly, when the input voltage of the motor M drops under a specified level, the generator G is driven by the turbine and generates continuously electric power without interruption despite the voltage drop.

Moreover, when the said voltage drop continues for a short period of time, only the air in the air tank is used to drive the turbine, whereby undesirable fuel consumption is effectively avoided.

In the embodiment of this invention, gasoline, heavy oil, light oil, etc. may be used as the fuel for the gas turbine. Furthermore, the higher the speed of the generator G, the smaller the gas turbine will be, so that it is preferable to employ a generator designed to develop as high a revolution speed as possible.

According to this invention, as may be understood from the above-mentioned explanation relating to the illustrations, upon occurrence of power failure or voltage drop, the electric generator is immediately driven by gas turbine without interruption of the voltage, so that power interruption is negligible and also it is unnecessary to provide a special device such as flywheel, auxiliary generator unit or the like which compensates power interruption unit starting completion of a main driving device which is equipped for driving the main generator in the case of failure or substantial drop of the input voltage of the motor driving the generator. Furthermore, voltage drop during starting of the gas turbine is considerably lower than the case employing a flywheel. And also, there is no apprehension that gas turbine may fail to get starting due to such nonignition as in the case of diesel engine, so that its reliability is very high. Although the efficiency of gas turbine itself is generally inferior to that of engine of other type, time of power failure is only 20–30 hours altogether at the most during a year, so that disadvantage due to low efficiency thereof is negligible.

Manufacturing cost of gas turbine is so low as it is about ⅓ that of diesel engine and also gas turbine is comparatively smaller in size and light in weight, so that it costs less for its installation and other incidentals.

Many modifications may be made in connection with this invention without departing from the true spirit and scope of my invention. For example, it may be possible to select the type of the gas turbine, number of gas burners, ignition manner etc. to meet diversified requirements.

While I have described as above, I claim as my invention:

1. In a system for generating electric power by a motor-generator unit having a common shaft and an input side, the combination comprising a gas turbine having a rotor attached to the shaft of the unit to be driven thereby, an air compressor, an oil pump, a clutch to connect the unit with said compressor and pump, an air tank communicating with the said compressor to be supplied with compressed air from the said compressor, a burner having an outlet directed to the said turbine and connected with the said air compressor and oil pump by input connectors, valve means in the input connectors between the said burner and the said oil pump and air tank, a voltage relay at the input side of said motor to open the said valve when the input voltage of the said motor drops under a specified level, and means to energize the said clutch with a time delay after the opening of the said valve whereby upon failure or substantial drop of the input voltage of the motor only air is first supplied to the turbine from the air tank and the said clutch is engaged with a time delay after the valve action to drive the air compressor and oil pump from the common shaft and to supply said turbine with compressed air and fuel through said burner to continue driving the generator.

2. In a system for generating electric power by a motor-generator unit having a common shaft and an input side, the combination comprising: a gas turbine having a rotor attached to the shaft of the said unit to be driven thereby, an air compressor, an oil pump, a clutch to connect said unit with said compressor and pump, an air tank connected to the said compressor to be supplied with compressed air from the said compressor, a burner having an outlet is directed to the said turbine and connected with the said air compressor and oil pump, a valve between the said burner and the said oil pump and air tank, and a voltage relay in the input side of the motor to open the said valve when the input voltage of the motor drops under a specified level, said members being operatively so related that upon failure or substantial drop of input voltage of the said motor air only may first be supplied to the said turbine from said tank through the burner to drive the said turbine as an air turbine and the said clutch may then be clutched with a time-lag after opening of the said valve to drive the said air compressor and oil pump from the common shaft and to supply said turbine with compressed air and fuel through said burner whereby driving of the generator is continued, and a pressure relay responsive to tank pressure drop to actuate said clutch.

3. In a system for generating electric power by a motor-generator unit having a common shaft and an input side, the combination comprising: a gas turbine having a rotor attached to the shaft of the said unit to be driven thereby, an air compressor, an oil pump, a clutch to connect said unit with said compressor and pump, an air tank connected to the said compressor to be supplied with compressed air from the said compressor, a burner having an outlet is directed to the said turbine connected with the said air compressor and oil pump, a valve means between the said burner and the said oil pump and air tank, and a voltage relay in the input side of the said motor to open the said valve when the input voltage of the said motor drops under a specified level, said members being operatively so related that upon failure or substantial drop of input voltage of the said motor air may be supplied to the said turbine from the said tank through the burner to drive the said turbine as an air turbine and the said clutch may then be actuated after a time-lag after opening of the said valve to drive the said air compressor and oil pump from the common shaft and to supply said turbine with compressed air and fuel through said burner, whereby driving of the generator is continued, and a time relay acting after a time-lag predetermined by the volume of the said air tank after closing of the said valve to actuate said clutch.

4. In a system for generating electrical power by a motor generator having a common shaft and input lines, the combination comprising a gas turbine having a rotor secured to the shaft of said motor generator, an air compressor having a shaft and an output, an oil pump connected to the shaft of said compressor, a clutch arranged to selectively connect the turbine to drive said air compressor and said oil pump, a tank connected to the output of said compressor, an oil burner having an outlet directed toward said turbine, means interconnecting the said tank and the said oil pump to the said oil burner, valve means disposed in the said interconnecting means, a relay connected to the motor input lines and responsive to motor input voltage drop to actuate the said valve means to interconnect said tank with said oil burner to force air through the outlet and operate the turbine as an air turbine, and means connected to said clutch and responsive to tank pressure drop to actuate said clutch to connect the motor generator shaft to drive the said air compressor and oil pump to operate said turbine as a gas turbine.

5. In a system for generating electrical power by a motor generator having a shaft, the combination comprising a gas turbine secured to the shaft of said motor generator, an air compressor having a shaft and an output, an oil pump connected to the shaft of said compressor, a clutch arranged to selectively connect the turbine to drive said air compressor and said oil pump, a tank connected to receive the output of said compressor, an oil burner having an outlet directed to said turbine, a conduit system interconnecting the said tank and the said oil pump to said oil burner, a normally closed valve in said conduit system and responsive to motor input voltage drop to open and interconnect said tank with said oil burner to pass air through said outlet and operate the turbine as an air turbine to thereby drive said motor generator prior to actuation of the said clutch.

6. The combination as set forth in claim 5, including means in said tank responsive to pressure drop to actuate said clutch to drive the said air compressor and oil pump to operate the said turbine as a gas turbine.

References Cited in the file of this patent

UNITED STATES PATENTS

| | | |
|---|---|---|
| 1,185,288 | Clarke | May 30, 1916 |
| 1,439,483 | Ritter | Dec. 19, 1922 |
| 1,662,366 | Cosgray | Mar. 13, 1928 |
| 1,998,655 | Bryan | Apr. 23, 1935 |
| 2,011,420 | Samuelson | Aug. 13, 1935 |
| 2,714,670 | Linder et al. | Aug. 2, 1955 |

FOREIGN PATENTS

| | | |
|---|---|---|
| 721,933 | Great Britain | Jan. 12, 1955 |